United States Patent
Ki et al.

(10) Patent No.: US 12,210,415 B2
(45) Date of Patent: Jan. 28, 2025

(54) FAULT RESILIENT STORAGE DEVICE

(71) Applicant: SAMSUNG ELECTRONICS CO., LTD., Suwon-si (KR)

(72) Inventors: Yang Seok Ki, Palo Alto, CA (US);
Sungwook Ryu, Palo Alto, CA (US);
Seontaek Kim, Sammamish, WA (US);
Changho Choi, San Jose, CA (US);
Ehsan Najafabadi, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/131,492

(22) Filed: Apr. 6, 2023

(65) Prior Publication Data

US 2023/0244570 A1    Aug. 3, 2023

Related U.S. Application Data

(63) Continuation of application No. 17/109,053, filed on Dec. 1, 2020, now Pat. No. 11,645,157.
(Continued)

(51) Int. Cl.
*G06F 11/14* (2006.01)
*G06F 3/06* (2006.01)
(Continued)

(52) U.S. Cl.
CPC ........ *G06F 11/1428* (2013.01); *G06F 3/0619* (2013.01); *G06F 3/0634* (2013.01);
(Continued)

(58) Field of Classification Search
CPC ............. G06F 11/1428; G06F 11/3034; G06F 11/3409
See application file for complete search history.

(56) References Cited

U.S. PATENT DOCUMENTS 5,546,533 A    8/1996    Koyama
6,049,439 A *  4/2000    Ono ..................... G11B 5/012
                                                    360/73.03
(Continued)

FOREIGN PATENT DOCUMENTS

CN    1924786 A     3/2007
CN    101084486 A   12/2007
(Continued)

OTHER PUBLICATIONS

Office Action for U.S. Appl. No. 17/109,017 dated Apr. 18, 2022, 13 pages.
(Continued)

*Primary Examiner* — Amine Riad
(74) *Attorney, Agent, or Firm* — Lewis Roca Rothgerber Christie LLP

(57)    ABSTRACT

A storage device, and a method for operating a storage device. In some embodiments, the storage device includes storage media, and the method includes: determining, by the storage device, that the storage device is in a first fault state from which recovery is possible by power cycling the storage device or by formatting the storage media; determining, by the storage device, that the storage device is in a second fault state from which partial recovery is possible by operating the storage device with reduced performance, with reduced capacity, or in a read-only mode; and operating the storage device with reduced performance, with reduced capacity, or in the read-only mode.

19 Claims, 15 Drawing Sheets

Related U.S. Application Data

(60) Provisional application No. 63/051,158, filed on Jul. 13, 2020, provisional application No. 63/052,854, filed on Jul. 16, 2020, provisional application No. 63/057,744, filed on Jul. 28, 2020.

(51) Int. Cl.

| | |
|---|---|
| *G06F 11/07* | (2006.01) |
| *G06F 11/10* | (2006.01) |
| *G06F 11/20* | (2006.01) |
| *G06F 11/30* | (2006.01) |
| *G06F 11/32* | (2006.01) |
| *G06F 11/34* | (2006.01) |
| *G06F 12/0882* | (2016.01) |
| *G06F 12/1009* | (2016.01) |

(52) U.S. Cl.
CPC .......... *G06F 3/0644* (2013.01); *G06F 3/0649* (2013.01); *G06F 3/065* (2013.01); *G06F 3/0673* (2013.01); *G06F 3/0679* (2013.01); *G06F 11/0772* (2013.01); *G06F 11/1068* (2013.01); *G06F 11/1076* (2013.01); *G06F 11/1484* (2013.01); *G06F 11/203* (2013.01); *G06F 11/2089* (2013.01); *G06F 11/2094* (2013.01); *G06F 11/3034* (2013.01); *G06F 11/3037* (2013.01); *G06F 11/3072* (2013.01); *G06F 11/327* (2013.01); *G06F 11/3409* (2013.01); *G06F 12/0882* (2013.01); *G06F 12/1009* (2013.01); *G06F 2201/85* (2013.01); *G06F 2212/262* (2013.01)

(56) References Cited

U.S. PATENT DOCUMENTS

| | | | |
|---|---|---|---|
| 6,301,644 B1 | 10/2001 | Andoh et al. | |
| 6,883,126 B1* | 4/2005 | Herman | G11B 20/18 |
| | | | 714/769 |
| 6,995,943 B1* | 2/2006 | Shrestha | G11B 5/59688 |
| 7,343,546 B2 | 3/2008 | Edirisooriya et al. | |
| 7,451,346 B2 | 11/2008 | Katsuragi et al. | |
| 7,536,595 B1* | 5/2009 | Hiltunen | G06F 11/0793 |
| | | | 714/26 |
| 7,574,623 B1 | 8/2009 | Goel et al. | |
| 7,590,664 B2 | 9/2009 | Kamohara et al. | |
| 7,640,450 B1* | 12/2009 | Anvin | G06F 11/0721 |
| | | | 714/2 |
| 7,774,643 B2* | 8/2010 | Wang | G06F 11/1435 |
| | | | 714/6.13 |
| 7,797,567 B2* | 9/2010 | Otaka | G06F 11/2007 |
| | | | 714/4.2 |
| 7,904,749 B2 | 3/2011 | Kawaguchi | |
| 7,984,328 B1* | 7/2011 | Coatney | G06F 11/1084 |
| | | | 714/6.32 |
| 8,015,436 B2* | 9/2011 | Winokur | G06F 11/1443 |
| | | | 714/42 |
| 8,145,603 B2 | 3/2012 | Yamagami | |
| 8,589,723 B2 | 11/2013 | Kumar et al. | |
| 8,769,535 B2 | 7/2014 | Mani | |
| 8,924,775 B1 | 12/2014 | Siew et al. | |
| 9,158,924 B2 | 10/2015 | Maeda et al. | |
| 9,176,813 B2 | 11/2015 | Guo et al. | |
| 9,336,819 B2* | 5/2016 | Cho | G11B 20/18 |
| 9,372,755 B1 | 6/2016 | Bruce et al. | |
| 9,378,083 B2* | 6/2016 | Ghaly | G06F 1/28 |
| 9,397,703 B2* | 7/2016 | Ghaly | G06F 11/079 |
| 9,547,562 B1 | 1/2017 | Feathergill et al. | |
| 9,697,081 B2* | 7/2017 | Miyamae | G06F 11/1084 |
| 9,710,317 B2 | 7/2017 | Gupta et al. | |
| 9,728,277 B2 | 8/2017 | Lee et al. | |
| 9,830,236 B2 | 11/2017 | Antony | |
| 9,940,028 B2 | 4/2018 | Tomlin | |
| 10,013,325 B1 | 7/2018 | Garrett, Jr. et al. | |
| 10,073,633 B2 | 9/2018 | Tsao et al. | |
| 10,082,965 B1 | 9/2018 | Tamilarasan et al. | |
| 10,095,506 B2 | 10/2018 | Gopalapura Venkatesh et al. | |
| 10,102,082 B2 | 10/2018 | Cabrera et al. | |
| 10,263,842 B2 | 4/2019 | Bursell | |
| 10,372,558 B2 | 8/2019 | Park et al. | |
| 10,445,200 B2 | 10/2019 | Park et al. | |
| 10,572,161 B2 | 2/2020 | Subramanian et al. | |
| 10,585,749 B2 | 3/2020 | Kachare et al. | |
| 10,915,401 B2 | 2/2021 | Fujii et al. | |
| 11,307,931 B1* | 4/2022 | Bert | G06F 11/073 |
| 11,630,731 B2 | 4/2023 | Ki et al. | |
| 11,909,809 B2 | 2/2024 | Kawabata | |
| 2004/0228493 A1 | 11/2004 | Ma | |
| 2005/0120267 A1* | 6/2005 | Burton | G06F 11/0793 |
| | | | 714/13 |
| 2006/0143507 A1 | 6/2006 | Tanaka | |
| 2007/0101188 A1 | 5/2007 | Lin | |
| 2008/0126849 A1 | 5/2008 | Kotzur et al. | |
| 2009/0106584 A1* | 4/2009 | Nakayama | G06F 11/0748 |
| | | | 714/2 |
| 2009/0164536 A1 | 6/2009 | Nasre et al. | |
| 2009/0222617 A1 | 9/2009 | Yano et al. | |
| 2010/0023847 A1* | 1/2010 | Morita | G11B 20/1879 |
| | | | 714/801 |
| 2010/0125751 A1 | 5/2010 | McKean | |
| 2011/0012147 A1* | 1/2011 | Bierhuizen | H01L 33/50 |
| | | | 257/E33.061 |
| 2012/0089767 A1 | 4/2012 | Lee et al. | |
| 2012/0215991 A1 | 8/2012 | Moyer | |
| 2013/0047028 A1 | 2/2013 | Daikokuya et al. | |
| 2013/0124780 A1 | 5/2013 | Baderdinni et al. | |
| 2013/0282953 A1 | 10/2013 | Orme et al. | |
| 2014/0032834 A1 | 1/2014 | Cudak et al. | |
| 2014/0089580 A1 | 3/2014 | Yochai et al. | |
| 2014/0095921 A1* | 4/2014 | Kobayashi | G06F 11/1417 |
| | | | 714/2 |
| 2014/0173337 A1* | 6/2014 | Igashira | G06F 11/1092 |
| | | | 714/6.22 |
| 2014/0195847 A1 | 7/2014 | Webman et al. | |
| 2014/0223096 A1 | 8/2014 | Zhe Yang et al. | |
| 2014/0359347 A1 | 12/2014 | Fuxa | |
| 2015/0100720 A1 | 4/2015 | Flynn et al. | |
| 2015/0269025 A1 | 9/2015 | Krishnamurthy et al. | |
| 2016/0004467 A1 | 1/2016 | Green et al. | |
| 2016/0034211 A1 | 2/2016 | Minamimoto | |
| 2016/0077911 A1* | 3/2016 | Malshe | G11C 16/08 |
| | | | 714/773 |
| 2016/0299722 A1 | 10/2016 | Seo et al. | |
| 2016/0342465 A1 | 11/2016 | Cudak et al. | |
| 2016/0378688 A1 | 12/2016 | Rozas et al. | |
| 2017/0147425 A1* | 5/2017 | Waheed | G06F 11/2094 |
| 2017/0177216 A1* | 6/2017 | Freyensee | G06F 3/0688 |
| 2017/0192886 A1 | 7/2017 | Boehm et al. | |
| 2017/0220374 A1 | 8/2017 | Beveridge et al. | |
| 2017/0277458 A1 | 9/2017 | Yamamoto | |
| 2018/0011376 A1 | 1/2018 | Cho et al. | |
| 2018/0011649 A1 | 1/2018 | Hashimoto et al. | |
| 2018/0067658 A1 | 3/2018 | Tripathy et al. | |
| 2018/0101450 A1 | 4/2018 | Park et al. | |
| 2018/0113761 A1 | 4/2018 | Ko et al. | |
| 2018/0239707 A1 | 8/2018 | Tsirkin | |
| 2018/0316756 A1 | 11/2018 | Kuramkote et al. | |
| 2019/0205220 A1 | 7/2019 | Zhang | |
| 2019/0250849 A1 | 8/2019 | Compton et al. | |
| 2019/0377637 A1 | 12/2019 | Pitchumani et al. | |
| 2019/0384670 A1 | 12/2019 | Kuroki et al. | |
| 2020/0020398 A1 | 1/2020 | Miller et al. | |
| 2020/0065027 A1 | 2/2020 | La Fratta et al. | |
| 2020/0135280 A1 | 4/2020 | Hu | |
| 2020/0192795 A1 | 6/2020 | Cai et al. | |
| 2020/0310932 A1 | 10/2020 | Hutchinson et al. | |
| 2021/0255778 A1 | 8/2021 | Garewal | |
| 2021/0349782 A1* | 11/2021 | Ki | G06F 3/0634 |
| 2021/0350033 A1 | 11/2021 | Kapinos et al. | |

(56) References Cited

U.S. PATENT DOCUMENTS

2021/0373796 A1 12/2021 Matosevich et al.
2022/0171568 A1* 6/2022 Goodall ................ G06F 3/0619

FOREIGN PATENT DOCUMENTS

| CN | 101727363 | A | 6/2010 |
| JP | 6-175792 | A | 6/1994 |
| JP | 6-274404 | A | 9/1994 |
| JP | 10-301721 | A | 11/1998 |
| JP | 11-184644 | A | 7/1999 |
| JP | 2006-350599 | A | 12/2006 |
| JP | 2012-509521 | A | 4/2012 |
| JP | 2013-246479 | A | 12/2013 |
| JP | 2017-201519 | A | 11/2017 |
| JP | 2021-33856 | A | 3/2021 |
| JP | 2021-89625 | A | 6/2021 |
| TW | 201413449 | A | 4/2014 |
| TW | 201729102 | A | 8/2017 |
| TW | 201911041 | A | 3/2019 |
| WO | WO 2018/142622 | A1 | 8/2018 |

OTHER PUBLICATIONS

Notice of Allowance for U.S. Appl. No. 17/159,913 dated May 2, 2022, 9 pages.
U.S. Final Office Action dated Dec. 19, 2022, issued in U.S. Appl. No. 17/109,041 (11 pages).
Notice of Allowance for U.S. Appl. No. 17/109,017 dated Nov. 18, 2022, 8 pages.
Notice of Allowance for U.S. Appl. No. 17/159,913 dated Dec. 5, 2022, 5 pages.
Final Office Action for U.S. Appl. No. 17/109,017 dated Aug. 17, 2022, 15 pages.
Notice of Allowance for U.S. Appl. No. 17/159,913 dated Aug. 8, 2022, 5 pages.
Office Action for U.S. Appl. No. 17/109,041 dated Sep. 22, 2022, 10 pages.
Unpublished U.S. Appl. No. 17/109,017, filed Dec. 1, 2020.
Unpublished U.S. Appl. No. 17/109,041, filed Dec. 1, 2020.
Unpublished U.S. Appl. No. 17/159,913, filed Jan. 27, 2021.
US Notice of Allowance dated Oct. 18, 2023, issued in U.S. Appl. No. 17/109,041 (8 pages).
US Office Action dated Mar. 30, 2023, issued in U.S. Appl. No. 17/109,041 (12 pages).
US Office Action dated Jan. 18, 2024, issued in U.S. Appl. No. 18/134,438 (12 pages).
U.S. Notice of Allowance dated Feb. 2, 2024, issued in U.S. Appl. No. 17/109,041 (8 pages).
U.S. Notice of Allowance dated May 9, 2024, issued in U.S. Appl. No. 17/109,041 (8 pages).
Japanese Notice of Allowance dated Jul. 23, 2024, issued in corresponding Japanese Patent Application No. 2021-115674, 4 pages.
Japanese Notice of Allowance dated Aug. 6, 2024, issued in corresponding Japanese Patent Application No. 2021-115930, 3 pages.
Japanese Office Action dated Aug. 6, 2024, issued in corresponding Japanese Patent Application No. JP 2021-115921, 4 pages.
U.S. Final Office Action dated Sep. 12, 2024, issued in U.S. Appl. No. 18/134,438 (9 pages).
Taiwanese Office Action dated Sep. 26, 2024, issued in corresponding Taiwanese Patent Application No. 110116137 (8 pages).
Taiwanese Office Action and Search Report for TW 11320927030 dated Sep. 6, 2024, 7 pages.

* cited by examiner

| Case ID | Operation Status | User Data | ReUse /How to |
|---|---|---|---|
| 1 | Fatal Error | Invalid | Can't |
| 2 | Fatal Error | Invalid | Can / Format NVM |
| 3 | Read Only Mode | Valid | Can't |
| 4 | Write Through Mode | Valid | Can't |
| 5 | Temperature Safe Mode | Valid | Can't |
| 6 | Read Only Mode | Valid | Can / Format NVM |

FIG. 2A

| Mode | P | UP | RO | VRO | IA |
|---|---|---|---|---|---|
| ① FR_MODE_POWER_CYCLE | 100% | | | | |
| ① FR_MODE_REFORMAT | 100% | | | | |
| ① FR_MODE_CAPACITY_READ_ONLY* | X% | | (100-X)% | | |
| ① FR_MODE_CAPACITY* | X% | | | | (100-X)% |
| ① FR_MODE_PERFORMANCE | | 100% | | | |
| ① FR_MODE_READ_ONLY | | | 100% | | |
| ① FR_MODE_PARTIAL_READ_ONLY* | | | X% | | (100-X)% |
| ① FR_MODE_TEMP_READ_ONLY* | | | | 100% | |
| ① FR_MODE_TEMP_PARTIAL_READ_ONLY* | | | | X% | (100-X)% |
| ① FR_MODE_VULNERABLE | | | | | 100% |

FIG. 2B

| Command | Description |
|---|---|
| FR_INFO_RESILIENCY_TYPE | Returns the type of fault resiliency in case of failure. |
| FR_INFO_RETENTION_PERIOD | Returns the average retention period without reprogramming by NAND media. This information is used for temporary read-only mode (FR_MODE_TEMP_READ_ONLY) or temporary partial read-only mode (FR_MODE_TEMP_PARTIAL_READ_ONLY). This is the upper-bound of retention time for data on the device from the time of the failure. |
| FR_INFO_IOPS | Returns the maximum time remaining for data integrity. This information is used for temporary read-only mode (FR_MODE_TEMP_READ_ONLY) or temporary partial read-only mode (FR_MODE_TEMP_PARTIAL_READ_ONLY). This is the lower-bound of retention time for data on the device from the time of the failure.<br><br>Note: the unit of time may be determined based on the patrol period. |
| FR_INFO_EARLIEST_EXPIRY | Returns the percentage of the maximum available IOPS on failure. This information is used for low performance mode (FR_MODE_PERFORMANCE). |
| FR_INFO_BW | Returns the percentage of the maximum available IOPS on failure. This information is used for low performance mode (FR_MODE_PERFORMANCE). |
| FR_INFO_SPACE | Returns the available space on failure. This information is used for small capacity with read-only mode (FR_MODE_CAPACITY_READ_ONLY) or small capacity (FR_MODE_CAPACITY) type. |

FIG. 2C

| | |
|---|---|
| •FAULT_RESILIENT_FEATURE | – This returns the fault resilient classes and features in each class that this device supports<br>– FR_FULLY_RESILIENT<br>  • FR_POWER_CYCLE: device can be recovered by power cycling<br>  • FR_REFORMAT: device can be recovered by reformatting<br>– FR_PARTIAL_RESILIENT<br>  • FR_PERFORMANCE_LOSS: device performance is reduced<br>    – FR_IOPS: IOPS can be reduced<br>    – FR_BW: Bandwidth can be reduced<br>  • FR_CAPABILITY_LOSS<br>    – FR_SUSTAINABLE_READ_ONLY: device can be read-only longer than NAND retention time<br>    – FR_UNSUSTAINABLE_READ_ONLY: device can be read-only up to NAND retention time<br>  • FR_SPACE_LOSS<br>    – FR_SPACE: the device storage space is reduced<br>– VULNERABLE<br>  • GRACEFUL_EXIT |
| •FAULT_RESILIENT_STATUS | – This returns the status of device after fault resilient recovery is done.<br>– FR_IOPS: the available IOPS is X%<br>– FR_BW: the available BW is Y%<br>– FR_SPACE: the available storage space is Z%<br>– FR_RETENTION: average retention period of media used in this device |
| •FAULT_RESILIENT_VOLATILE_BLOCKS (H) | – This returns a list of LBA ranges that reach to the retention period in next H hours<br>– This can be used to determine the blocks that need to be relocated for unsustainable read only |
| •FAULT_RESILIENT_INVALID_DATA_BLOCKS | – This returns a list of LBA ranges that become invalid after switch to a fault resilient mode |

FIG. 2D

FAULT RESILIENT STORAGE DEVICE

CROSS-REFERENCE TO RELATED APPLICATION(S)

The present application is a continuation of U.S. patent application Ser. No. 17/109,053, filed Dec. 1, 2020, which claims priority to and the benefit of (i) U.S. Provisional Application No. 63/051,158, filed Jul. 13, 2020, entitled "Fault Resilient Storage Device and Interfaces", (ii) U.S. Provisional Application No. 63/052,854, filed Jul. 16, 2020, entitled "Fault Resilient Drive with Sustainable Read-only Feature", and (iii) U.S. Provisional Application No. 63/057,744, filed Jul. 28, 2020, entitled "FAULT RESILIENT RAID-0 METHOD USING FAULT RESILIENT DRIVES". The entire contents of all of the applications identified in this paragraph are incorporated herein by reference.

FIELD

One or more aspects of embodiments according to the present disclosure relate to data storage systems, and more particularly to data storage systems and devices configured to demonstrate resiliency in the presence of internal fault conditions.

BACKGROUND

The present background section is intended to provide context only, and the disclosure of any embodiment or concept in this section does not constitute an admission that said embodiment or concept is prior art.

Storage devices and systems have wide applicability within a variety of data processing systems. Storage devices are sufficiently complex to be able to encounter a significant range of internal fault conditions, including, for example, temperature sensor failures, or radiation-induced bit flips. If these fault conditions are not taken into account in the design of a storage device or of a system using such storage devices (e.g., a redundant array of independent disks (RAID)) it is possible that a single fault in a storage device may render the entire storage device, and possibly a larger system (such as a RAID) containing the storage device, inoperable.

Thus, there is a need for a system and method for resilient operation of storage devices and systems containing storage devices.

SUMMARY

In some embodiments, a fault resilient storage device may be capable of operating in various resilient modes, while maintaining partial capability, or of returning to full functionality in spite of internal faults. One of the ways in which the storage device may maintain partial capability is to operate, in some circumstances, in a read-only mode, in which the storage device may respond to read requests from a host but return an error message if it receives a write request from a host. In a RAID-0 storage system, the possibility that a storage device may transition to operating in a read-only mode may be accommodated by redistributing the strips that make up a stripe for any write operations performed after the storage device has transitioned to operating in read-only mode.

According to an embodiment of the present invention, there is provided a method for operating a storage device including storage media, the method including: determining, by the storage device, that the storage device is in a first fault state from which recovery is possible by power cycling the storage device or by formatting the storage media; determining, by the storage device, that the storage device is in a second fault state from which partial recovery is possible by operating the storage device with reduced performance, with reduced capacity, or in a read-only mode; and operating the storage device with reduced performance, with reduced capacity, or in the read-only mode.

In some embodiments, the method further includes: determining, by the storage device, that the storage device is in a third fault state different from the first fault state and the second fault state; and operating the storage device in a mode in which read and write operations are not performed, and in which the storage device returns errors in response to received read or write commands, wherein: the storage device includes a controller including a first core and a second core, and the third fault state includes a sub-state in which the first core determines that the second core has failed.

In some embodiments, the method further includes: receiving a query, from a host, regarding a status of the storage device, and responding to the query with a status corresponding to a status in a status hierarchy.

In some embodiments, the status hierarchy includes a first level, including: a fully resilient status, corresponding to the first fault state; and a partially resilient status, corresponding to the second fault state.

In some embodiments, the partially resilient status includes a first sub-status indicating a loss of capability, the first sub-status including: a first sub-sub-status, indicating operation in a sustainable read-only mode; and a second sub-sub-status, indicating operation in an unsustainable read-only mode.

In some embodiments, the receiving of the query includes receiving the query through a nonvolatile memory express (NVMe) interface, and the responding to the query includes responding through the nonvolatile memory express (NVMe) interface.

In some embodiments: the first fault state includes a first sub-state in which a program execution error of a controller of the storage device has caused incorrect data to be written to the storage media; the determining that the storage device is in the first fault state includes determining that a pointer is out of range; and the first fault state includes a second sub-state in which a program execution error of a controller of the storage device has occurred since the most recent write to storage media by the controller.

In some embodiments, the method further includes reformatting a portion of the storage media, wherein the reformatting includes reformatting the entire storage media.

In some embodiments, the method includes operating the storage device with reduced performance.

In some embodiments, the operating with reduced performance includes: receiving, from a host connected to the storage device, a write command including data; writing the data to the storage media; and sending a command completion to the host, wherein the writing of the data to the storage media and the sending of the command completion to the host is performed as part of a synchronous write.

In some embodiments, the operating with reduced performance includes: performing a first write to the storage media; waiting, during an interval corresponding to the reduced performance; and performing a second write to the storage media.

In some embodiments, the method includes operating the storage device with reduced capacity.

According to an embodiment of the present invention, there is provided a storage device including: a processing circuit; and storage media, the processing circuit being configured to: determine that the storage device is in a first fault state from which recovery is possible by power cycling the storage device or by formatting the storage media; determine that the storage device is in a second fault state from which partial recovery is possible by operating the storage device with reduced performance, with reduced capacity, or in a read-only mode; and operate the storage device with reduced performance, with reduced capacity, or in the read-only mode.

In some embodiments, the processing circuit is further configured to: receive a query, from a host, regarding a status of the device, and respond to the query with a status corresponding to a status in a status hierarchy, wherein the status hierarchy includes a first level, including: a fully resilient status, corresponding to the first fault state; and a partially resilient status, corresponding to the second fault state.

In some embodiments, the receiving of the query includes receiving the query through a nonvolatile memory express (NVMe) interface, and the responding to the query includes responding through the nonvolatile memory express (NVMe) interface.

In some embodiments, the processing circuit is configured to operate the storage device with reduced performance, wherein the operating with reduced performance includes: performing a first write to the storage media; waiting, during an interval corresponding to the reduced performance; and performing a second write to the storage media.

According to an embodiment of the present invention, there is provided a system, including a storage device including: means for processing; and storage media, the means for processing being configured to: determine that the storage device is in a first fault state from which recovery is possible by power cycling the storage device or by formatting the storage media; determine that the storage device is in a second fault state from which partial recovery is possible by operating the storage device with reduced performance, with reduced capacity, or in a read-only mode; and operate the storage device with reduced performance, with reduced capacity, or in the read-only mode.

In some embodiments, the means for processing is further configured to: receive a query, from a host, regarding a status of the device, and respond to the query with a status corresponding to a status in a status hierarchy, wherein the status hierarchy includes a first level, including: a fully resilient status, corresponding to the first fault state; and a partially resilient status, corresponding to the second fault state.

In some embodiments, the receiving of the query includes receiving the query through a nonvolatile memory express (NVMe) interface, and the responding to the query includes responding through the nonvolatile memory express (NVMe) interface.

In some embodiments, the means for processing is configured to operate the storage device with reduced performance, wherein the operating with reduced performance includes: receiving, from a host connected to the storage device, a write command including data; writing the data to the storage media; and sending a command completion to the host, wherein the writing of the data to the storage media and the sending of the command completion to the host is performed as part of a synchronous write.

BRIEF DESCRIPTION OF THE DRAWINGS

The drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

FIG. 2A is a table of fault states of a storage device, according to an embodiment of the present disclosure;

FIG. 2B is a table of operating modes of a storage device, according to an embodiment of the present disclosure;

FIG. 2C is a table of commands for sending to a storage device by a host, according to an embodiment of the present disclosure;

FIG. 2D is a table showing a hierarchy of resilient modes, according to an embodiment of the present disclosure;

DETAILED DESCRIPTION

The detailed description set forth below in connection with the appended drawings is intended as a description of exemplary embodiments of a system and method for resilient operation of storage devices and systems containing storage devices provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In some embodiments, a fault resilient storage device may be capable of operating in various resilient modes, and capable of maintaining partial capability, or returning to full functionality, in spite of internal faults. For example, in response to a temperature sensor failure, the storage device may operate at a reduced rate, or at a reduced rate for write operations, or it may cease to perform write operations entirely. In response to a transient failure that may have corrupted the storage media, the storage device may reformat the storage media. In response to a transient failure that did not corrupt the storage media, the storage device may cycle power. One of the ways in which the storage device may maintain partial capability is to operate, in some circumstances, in a read-only mode, in which the storage device may respond to read requests from a host but return an error message if it receives a write request from a host. It may also move data that is about to expire to a rescue area, so that the data will not be lost as a result of expiring. In a RAID-0 storage system, the possibility that a storage device may transition to operating in a read-only mode may be accommodated by redistributing the strips that make up a stripe for any write operations performed after the storage device has transitioned to operating in read-only mode.

Figure 1:
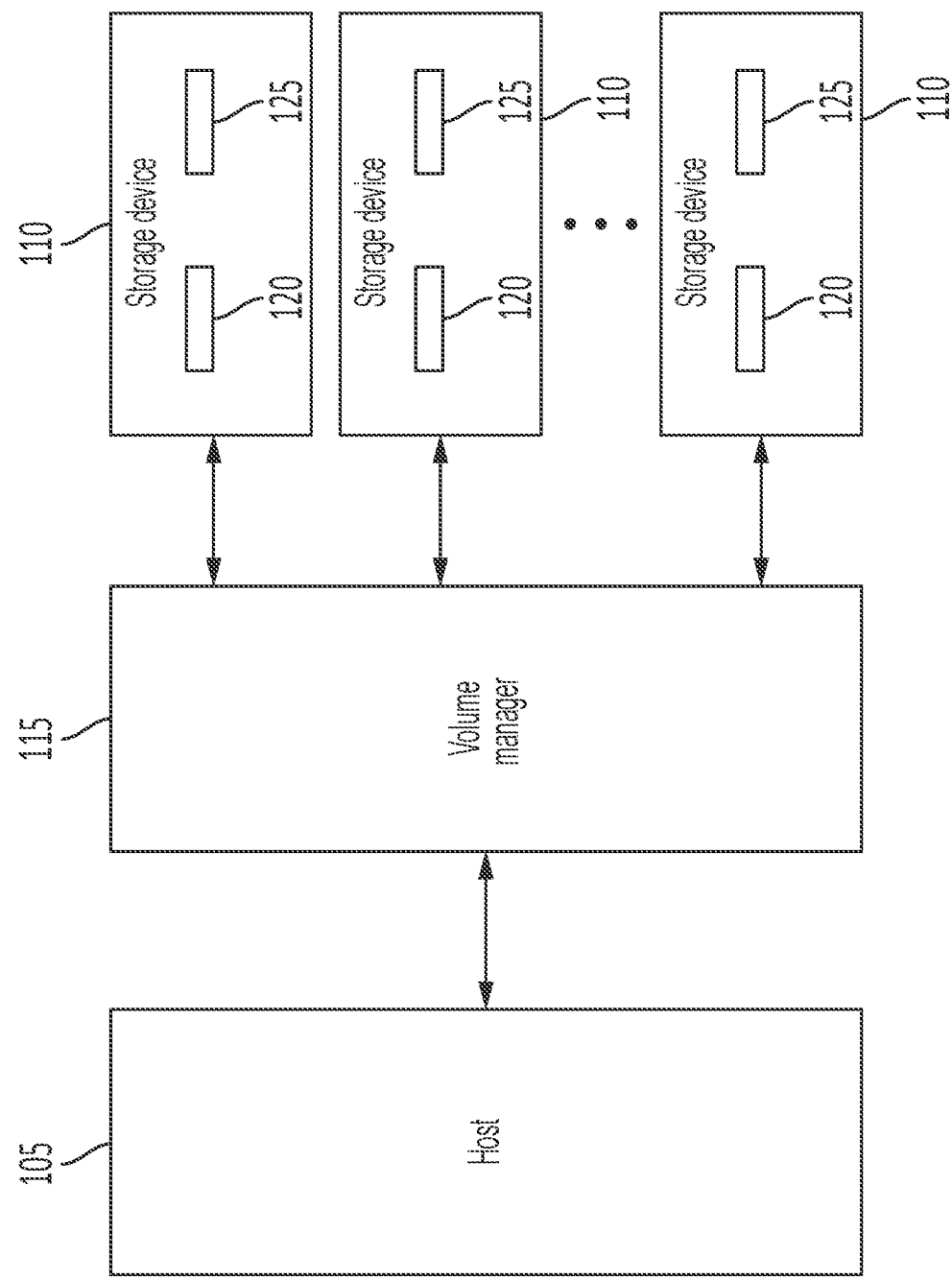
FIG. 1 is a block diagram of a data storage system, according to an embodiment of the present disclosure.

FIG. 1 shows a computing system, including a host 105 connected to one or more storage devices 110 (or "drives"). The storage devices 110 may be connected to the host 105 through a volume manager 115 (discussed in further detail below) as shown, or they may be directly connected to the host 105. In some embodiments, a storage device 110 may experience an internal fault condition, and the storage device may exhibit various resilient behaviors, as discussed in further detail below, to mitigate the system-level impact of the fault condition. Each storage device 110 may be a solid state drive (SSD) and it may include a controller 120 (or "control circuit") and storage media 125 (e.g., not AND (NAND) flash memory). The smallest erasable unit in the storage device 110 may be referred to as a "block" and the smallest writeable unit in the storage device 110 may be referred to as a "page". Each storage device 110 may have a form factor that is any one of a plurality of form factors suitable for persistent storage devices, including but not limited to 2.5", 1.8", MO-297, MO-300, M.2, and Enterprise and Data Center SSD Form Factor (EDSFF), and it may have an electrical interface, through which it may be connected to the host 105, that is any one of a plurality of interfaces suitable for persistent storage devices, including Peripheral Component Interconnect (PCI), PCI express (PCIe), Ethernet, Small Computer System Interface (SCSI), Serial AT Attachment (SATA), and Serial Attached SCSI (SAS).

The storage media 125 may have a retention period (which may depend on the usage history of the storage media 125, and, as such, may vary within the storage media 125); data that has been stored longer than the retention period (i.e., data having an age exceeding the retention period) may become unreliable and may be said to have expired. Data may be stored in the storage media 125 using an error correcting code, which may be a block code. When data is read from the storage media 125, a quantity of raw data, referred to as a code block, may be read from the storage media 125, and an attempt to decode it may be made. If the attempt fails, additional attempts (read retrials) may be made. With use, a portion, e.g., a block, of the storage media 125 may degrade to the point that the retention period becomes unacceptably short, and the block may be classified as a "bad block". To avoid allowing this circumstance to render the entire storage media 125 inoperable, reserve space, referred to as "bad block management reserve space" may be present (e.g., included in each flash memory die or in each flash memory plane), and the controller 120, or another controller internal to the flash memory die or to the flash memory plane may begin to use a block in the reserve and cease to use the bad block.

FIG. 2A is a table of fault conditions (or "fault states"), each labeled with a case identifier ("Case ID"). Case 1 is any fault condition in which the storage device 110 is no longer capable of performing read or write operations, and that cannot be resolved by cycling power or reformatting the storage media. The state in which the storage device 110 behaves in this manner may have various sub-states, with, e.g., each sub-state corresponding to a different failure mechanism. Such a state, or fault condition (in which the storage device 110 is no longer capable of performing read or write operations, and that cannot be resolved by cycling power or reformatting the storage media) may be caused, for example, by a portion of the controller's firmware becoming corrupted (in which case it may be possible for the controller to restart into a safe mode, in which the corrupted instructions are not executed) or by a failure of a processing circuit in the storage device 110 (e.g., the failure of a processing circuit that manages interactions with the storage media but is not responsible for communications with the host 105). When a fault condition of this type occurs, the storage device 110 may respond to any read or write command from the host 105 with an error message.

Case 2 is any fault condition (i) in which the storage device 110 is no longer capable of performing read or write operations and (ii) from which recovery is possible by cycling the power of the storage device 110 or by reformatting the storage media. Such a fault condition may be caused, for example, by a program execution error of the controller 120 of the storage device 110 (e.g., a pointer that is out of range as a result of a bit flip in the random-access memory (RAM) of the controller 120, or an instruction that is incorrect, as a result of a bit flip). If the program execution error has not caused the controller 120 to write incorrect data to the storage media 125 (e.g., if the program execution error occurred since the most recent write to storage media by the controller), then power cycling the storage device may be sufficient to restore the storage device 110 to normal operation; if the program execution error has caused the controller 120 to write erroneous data to the storage media 125, then reformatting the storage media 125 may be sufficient to restore the storage device 110 to normal operation.

Case 3 is any fault condition that may be mitigated by operating the storage device 110 in a read-only mode, and for which reformatting the storage media 125 will not restore full functionality. Examples of such faults include (i) a temperature sensor failure, and (ii) a portion of the storage media 125 having transitioned to a read-only mode. In the case of the temperature sensor failure, the failure may be detected by determining that a temperature sensor reading is out of range (e.g., has exceeded a threshold temperature), and in such a case the risk of overheating of the storage device 110 may be reduced by avoiding write operations, which may dissipate more power than read operations. The transitioning to a read-only mode of a portion of the storage media 125 may occur, for example, for flash memory storage media 125, if a flash memory plane or die exhausts the bad block management reserve space used for run time bad block management. For example, the storage device 110 may, while attempting to performing a read operation, make an unsuccessful attempt to decode a data item, determine that the block storing the data is a bad block and upon moving the data from the bad block to the bad block management reserve space, determine that the remaining bad block management reserve space is less than a threshold size and therefore insufficient to insure the reliability of the plane or die. The storage device 110 may then determine that bad block management is no longer being performed, and transition to a read-only mode. Operation of the read-only mode is discussed in further detail below. As used herein, a "data item" is any quantity of data being processed in one operation, e.g., the data resulting from decoding a code block may be a data item.

Case 4 is any fault condition that may be mitigated by operating the storage device 110 in a write-through mode. For example, if a power supply backup capacitor in the storage device 110 fails, the device may, in response to any write commands received from the host, complete the write to the storage media 125 before sending a command completion to the host 105, so that if power fails before the write to the storage media 125 has been completed, the host is not incorrectly informed that the write was completed successfully. Operating in the write-through mode may result in a reduction of performance (in terms of throughput and latency).

Case 5 is any fault condition that may be mitigated by operating the storage device 110 in a manner that reduces power dissipation. For example, in the case of a temperature sensor failure, the storage device 110 may operate in a read-only mode as mentioned above, or it may reduce the rate at which operations (e.g., write operations, which may dissipate more power than read operations) are performed, to reduce power dissipation in the storage device 110. For example, the storage device 110 may perform a first write to the storage media, then wait, during an interval corresponding to the reduced performance (the waiting resulting in a decrease in the rate at which write operations are performed); and then perform another (e.g., a second) write to the storage media.

Case 6 is any fault condition that may be mitigated by operating the storage device 110 in a read-only mode, and for which reformatting the storage media 125 will restore full functionality. The third column of the table of FIG. 2A indicates, for each case, whether valid user data remain available, and whether the storage device 110 may, e.g., by reformatting the storage media 125, be returned to full functionality.

As exemplified by the cases listed in FIG. 2A, in some embodiments three levels of fault resiliency may be achievable by a storage device 110, a fully resilient mode, a partially resilient mode, and a vulnerable mode. In the fully resilient mode, the storage device 110 may operate with "self-healing"_features, and the storage device 110 may be capable of recovering full functionality (although the user data in the device may be lost) by resetting operations such as power cycling or formatting of the storage media 125.

In the partially resilient mode, the storage device 110 may operate with lower performance, smaller capacity, or reduced capability, when a fault condition exists. For example, as mentioned above, if a power supply backup capacitor fails, all writes may be completed (i.e., command completions may be sent to the host 105) only after data is written to the storage media 125 (i.e., only synchronous writes may be performed), slowing the operation of the storage device 110, and reducing its performance. The user data may be preserved, in this circumstance. The storage devices 110 may operate with smaller capacity if the reserve space for bad block management run time bad block (RTBB) is exhausted. In this circumstance, the affected dies in the storage device 110 may be excluded from the disk space and the overall disk capacity may be reduced. The user data on the lost space may be lost. For example, if a set in IO determinism or a zone in a zoned namespace is no longer capable of accepting new data writes, the set or the zone may be excluded from disk space but the remaining disk space may remain available for read and write operations. The user data on the zone or set may be lost.

The storage device 110 may operate with reduced capability if a storage device 110 does not allow write operations, and switches to a read-only mode. The storage device 110 may be capable operating in two types of read-only mode: a sustainable read-only mode (which may be referred to as a "first read-only mode"), and an unsustainable read-only mode (which may be referred to as a "second read-only mode"). In the sustainable read-only mode, the storage device 110 may continue to serve read requests beyond the retention period of the storage media 125. The unsustainable read-only mode may be employed when it is not feasible to operate in the sustainable read-only mode, e.g., when there is insufficient unused storage space to set up a rescue space (discussed in further detail below). When transitioning to the unsustainable read-only mode, the storage device 110 may send to the host 105 a notification that the storage device 110 is operating in the second (unsustainable) read-only mode, and that data items stored in the storage device 110 will be allowed to expire (e.g., at the end of their respective retention periods). In the unsustainable read-only mode, the storage device 110 may continue to serve read requests during the retention period of the storage media 125, and, if the storage device 110 encounters data integrity issues (as detected, for example, by one or more unsuccessful attempts to decode data during read operations, the storage device 110 may report the invalid data region. A storage device 110 operating in the vulnerable mode may, as mentioned above, be incapable of performing read or write operations, and may perform a graceful exit, continuing to receive commands from the host and returning errors.

In some embodiments, five logical block address (LBA) space types may be defined, referred to as (i) performing space (P), (ii) underperforming space (UP), (iii) read-only space (RO), (iv) volatile read-only space (VRO), and (v) inaccessible space (IA). Performing (P) space may be LBA space containing valid data, which is capable of being read and written in a normal manner without sacrificing performance. Underperforming (UP) space may be LBA space containing valid data, which is capable of being read and written in a normal manner, but with degraded performance (e.g., degraded write performance). Read-only (RO) space may be LBA space containing valid data, which is read-only. The storage device 110 may respond with error messages to write commands from the host directed to this type of LBA space. The data in read-only space may remain valid for a period of time exceeding the retention period. Volatile read-only (VRO) space may be read-only, and the storage device 110 may respond with error messages to write commands from the host directed to this type of LBA space. Data in this type of LBA space may be temporarily valid, and may become invalid when it expires, i.e., when the age of the data in the storage media 125 reaches the retention period of the storage media 125. Inaccessible (IA) space may be LBA space containing invalid data, which is not accessible from the host. The table of FIG. 2B shows the combinations of LBA space types that may be present in a storage device 110 in each of the fault conditions identified in the first column of the table. The modes identified with an asterisk (*) may support the host's using a get feature command to retrieve the detailed information about LBA space. FIG. 2C shows arguments of a "get feature" command, that may be passed to a storage device 110 to query the storage device 110 regarding its state and the values of associated parameters ("IOPS" means input and output operations per second).

The table of FIG. 2D shows nonvolatile memory express (NVMe) commands that a host 105 may employ to query a storage device 110 regarding its status, and a hierarchy of enumerated constants, within the category of fault resilient features, that the storage device 110 may employ to respond. As illustrated in FIG. 2D, the hierarchy may include a first level, including a fully resilient status, a partially resilient status, and a vulnerable status. Sub-statuses, and sub-sub-statuses may also be defined. For example, as shown in FIG. 2D, the partially resilient status includes a first sub-status indicating a loss of capability, and the first sub-status includes a first sub-sub-status, indicating operation in the sustainable read-only mode; and a second sub-sub-status, indicating operation in the unsustainable read-only mode.

Figure 3A:
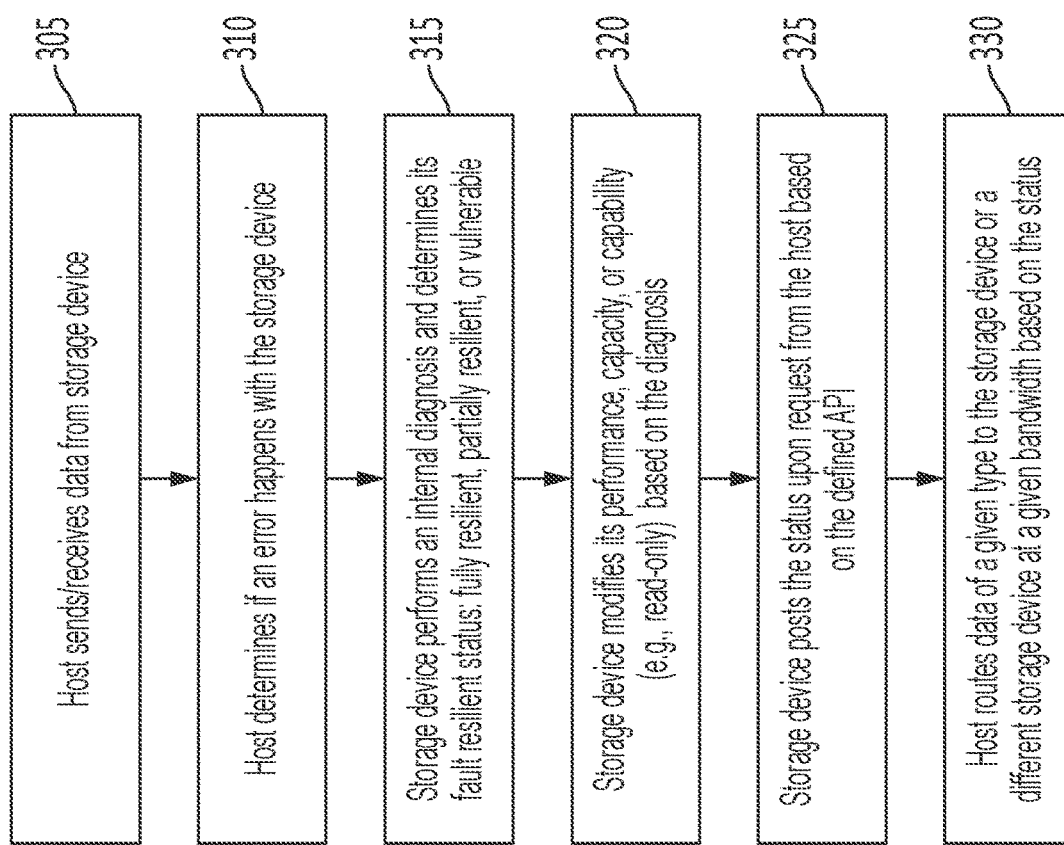
FIG. 3A is a flow chart for a first method of operation of a fault-resilient storage device, according to an embodiment of the present disclosure.
Figure 3B:
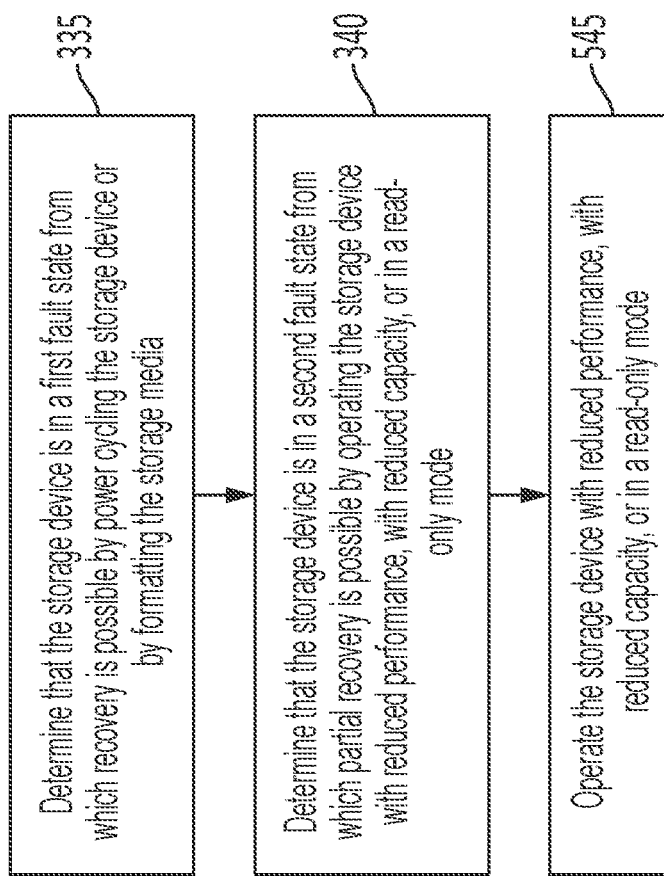
FIG. 3B is a flow chart for a second method of operation of a fault-resilient storage device, according to an embodiment of the present disclosure.

FIG. 3A is a flow chart of a method for operating in a fault resilient mode, in some embodiments. At 305, the host 105 sends or receives data from storage device; at 310, the host 105 determines whether an error has occurred in the storage device; at 315, the storage device 110 performs an internal diagnosis and determines its fault resilient status (e.g., fully resilient, partially resilient, or vulnerable); at 320, the storage device 110 modifies its performance, capacity, or capability (e.g., transitioning to a read-only mode) based on the diagnosis; at 325, the storage device 110 posts the status upon request from the host 105 based on an application programming interface (API); and at 330, the host 105 routes data of a given type to the storage device 110 or to a different storage 110 device at a given bandwidth based on the status. FIG. 3B is a flow chart showing details of a method for operating in a fault resilient mode. The method includes: at 335, determining, by the storage device, that the storage device is in a first fault state from which recovery is possible by power cycling the storage device or by formatting the storage media; at 340, determining, by the storage device, that the storage device is in a second fault state from which partial recovery is possible by operating the storage device with reduced performance, with reduced capacity, or in a read-only mode; and, at 345, operating the storage device with reduced performance, with reduced capacity, or in a read-only mode.

A number embodiments and variations on the embodiments disclosed herein may also be constructed. A field programmable gate array (FPGA) or embedded processor may perform internal block checks and send asynchronous updates to the host 105 on the status of the storage device 110. Events may occur and be transmitted to the host 105 (e.g., temperature, or other parameters internal to the device). The host 105 may poll the storage devices 110 on a predetermined schedule, if there is no device driver feature for providing notification. An FPGA or embedded processor may monitor the historical performance of the storage device 110 and use machine learning to provide predictive analytics (e.g., a likelihood to be in a given fault resilient state). Commands may be introduced in the NVMe specification; for example, telemetry information of the NVMe specification may be expanded (to report the state of the storage device 110). Some embodiments may be implemented in, for example, Ethernet storage devices or key-value (KV) storage devices.

In some embodiments, the host may (i) send different data types (e.g., file types such as image, video, text, or high-priority or low-priority data) based on the status of the storage device 110 (for instance, high priority data or real-time data may not be written to a device that is considered in the partially vulnerable mode); (ii) reduce the transmission rate if the storage device 110 is in a partially vulnerable state and in a lower performance state; (iii) send a reduced total amount of data if the storage device 110 is in a partially vulnerable and lower capacity state; (iv) read data at the greatest rate possible, and store the data elsewhere, if the storage device 110 is in a partially vulnerable unsustainable read-only mode, so as to avoid exceeding the retention period (in such a circumstance, the host may calculate the needed data rate based on the amount of data to be copied and on the retention period); (v) ignore data "read" from a vulnerable storage device 110 since it is erroneous, and simply delete the data as it is received by the host 105, (vi) temporarily reroute read/write input and output to a cache in a fully resilient storage device 110 that is being power cycled or formatted, based on messages that control the timing of such events between the host and the storage devices 110. An FPGA on a partially vulnerable SSD that has had a capacity decrease may filter incoming data writes and only write a portion of that data to the storage device 110. In some cases, the filtering may include compression. Such an FPGA may receive various kinds of data (e.g., file types such as image, video, text, or high-priority or low-priority data) from a host 105 and filter based on the status of the storage device 110. For instance, the FPGA may determine that high priority data should not be written to a storage device 110 that is in the partially vulnerable mode. The FPGA may send a rejection message to the host 105 and give a reason for the rejection. Alternatively, the FPGA may filter out a certain type of data (e.g., image data) for writing to a partially resilient lower-capacity state storage device 110. For example, if a storage device 110 loses performance (e.g., operates at a reduced write rate), latency-sensitive reads and writes may be rejected.

In some embodiments, as mentioned above, a storage device 110 may operate in one of two read-only modes, which may be referred to as a "sustainable" (or "first") read-only mode and an "unsustainable" (or "second") read-only mode. In the unsustainable read-only mode, the storage device 110 may simply reject any write commands it may receive from the host 105, and it may (i) attempt to execute read commands for unexpired data or (ii) attempt to execute all read commands, returning the data resulting from any successful decoding attempts and an error code (an indication that a data item cannot be read, e.g., a zero) if decoding does not succeed.

In the sustainable read-only mode, the storage device 110 may be capable of serving external read requests beyond the retention period of the storage media 125. The storage device 110 may take no action except to return an error message, in response to any write commands from the host 105 host 105, although it may perform writes to the storage media 125 for internal purposes, as described in the following. To make possible the preservation of data beyond the retention period, the storage device 110 may allocate a space, referred to as the "rescue space", to which it moves data that is about to expire (e.g., data having an age exceeding a threshold age, the threshold age being based on (e.g., being 80% of) the retention period of the storage media 125), so that the expiration of the data is then postponed by the retention period of the rescue space. If data in the rescue space are about to expire, they may be moved again, within the rescue space, as often as needed, to prevent data loss. In some embodiments, the storage device 110 moves data well in advance of its expiration, taking advantage of periods of low load, for example, to perform such moves. As mentioned above, a transition to sustainable read-only mode may be triggered by the exhaustion of bad block management reserve space. In this circumstance, the affected planes or dies may become read-only and may be excluded from the physical address space of the storage device 110, once all of the data stored in them has been relocated to the rescue space.

The storage device 110 may respond to read commands from the host 105 across the entire LBA space. Because the physical space of the storage device 110 may be reduced (e.g., because a portion of the storage media 125 has become read-only and its data are being moved (or have been moved) to the rescue space), but the logical space of device is unchanged, the storage device 110 may return zero if the host 105 host 105 sends a read command within LBA space that cannot be mapped to Physical Block Address (PBA) space.

The rescue space may be allocated from overprovisioning space, or from any unused space on the storage device 110. If a set in IO determinism or a zone in zoned namespace is not writeable, the set or the zone may become read-only and excluded from physical address space once all data is relocated. Rescue space may be created dynamically using namespaces. One or more namespaces may be used for user data, and an additional namespace may be created for rescue space. When the storage device 110 transitions to sustainable read-only mode, one or more of the namespaces for user data may be reduced in size, and the size of the namespace for rescue space may be increased.

If the size of the region of the storage media 125 affected by the fault (e.g., within which bad block management reserve space has been exhausted) exceeds the size of the available rescue space, then the storage device 110 may move only the data that will be expiring soonest (e.g., the oldest data), or move only data that is tagged as being important or related to a given file type (e.g., images, video, or documents), or move data of a contiguous type (e.g., all of the data related to a file), and leave behind other data. The set of file types deemed important may be user configurable. In some embodiments employing KV storage devices 110, the data importance may be compressed or encoded with key value pairs.

In some embodiments, the storage device 110 may determine that the amount of rescue space available is less than a threshold size and therefore insufficient to support operating in the sustainable read-only mode, and, as a result the storage device 110 may transition to the unsustainable read-only mode. Such a determination may be made when the fault is first detected, or it may be that when the fault is first detected the storage device 110 initially transitions to the sustainable read-only mode, and that after some time the rescue space is consumed (e.g., by the continuing expiration of data in the faulty part of the storage media 125) to the extent that the available rescue space decreases to less than the threshold size, and the storage device 110 may then transition from the sustainable read-only mode to the unsustainable read-only mode. Upon transitioning from the sustainable read-only mode to the unsustainable read-only mode, the storage device 110 may notify the host 105 of the transition, and the host 105 may then attempt to copy as much of the data as possible from the storage device 110 to another storage device, before the data expires.

In some circumstances data may be lost over a period of, e.g., one day or one hour. As such, an FPGA in the storage device 110 may monitor the nature of the data on the drive (e.g., old, tagged, continuous, or by file-type) to facilitate transfer when the storage device 110 transitions to sustainable read-only mode. The FPGA may queue the data, or order the data to be transferred to the rescue space, in order of precedence, and it may compress the data when the data is moved into the rescue space. Some embodiments may be implemented in, for example, Ethernet storage devices or key-value (KV) storage devices.

Figure 4:
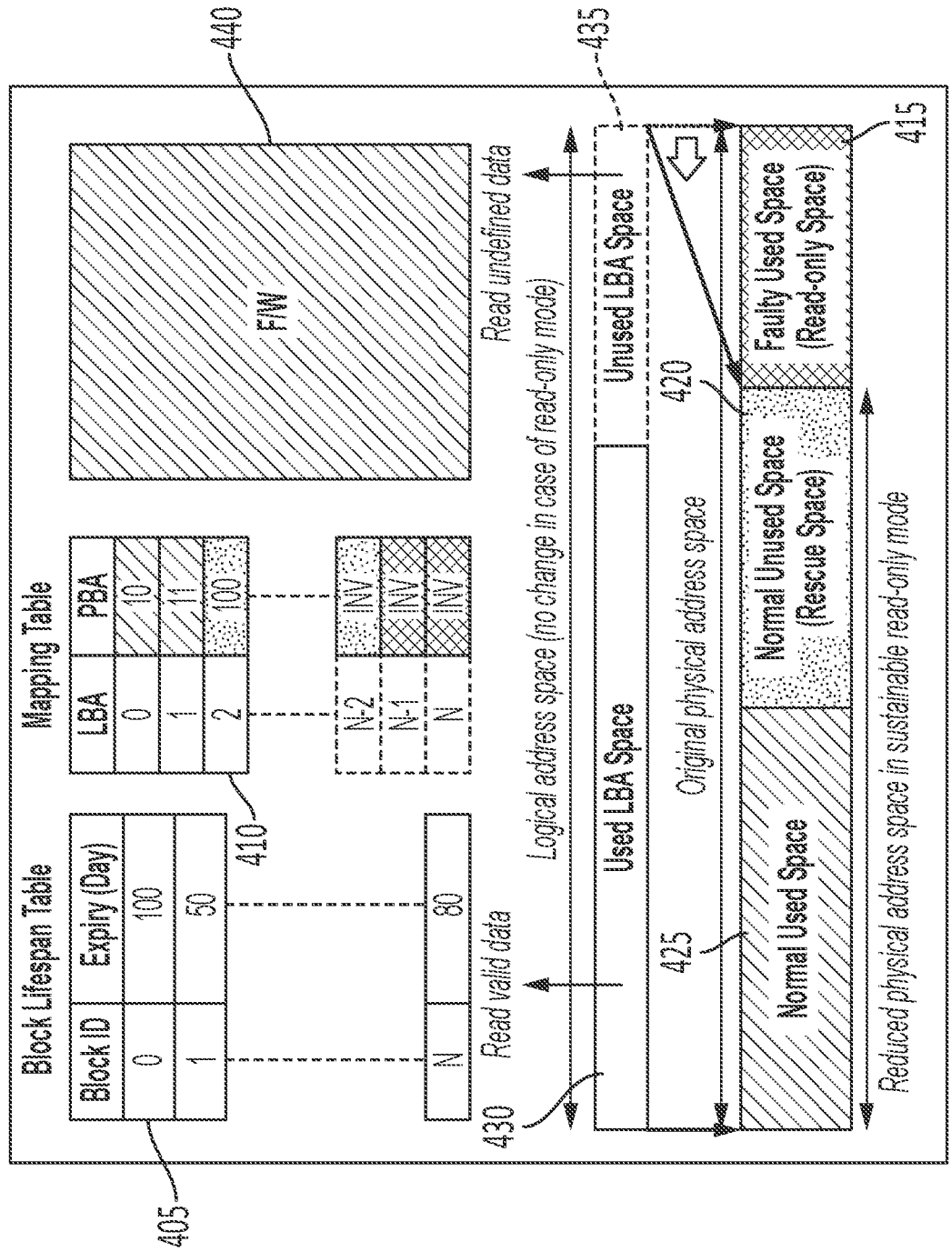
FIG. 4 is a schematic data layout diagram of a storage device, according to an embodiment of the present disclosure.

FIG. 4 is a schematic data layout diagram of a storage device 110 in some embodiments. A block lifespan table 405 lists the retention period of each block in the storage device 110, and a mapping table 410 lists mappings from logical block address to physical block addresses. When the storage device 110 transitions to the sustainable read-only mode, the storage device 110 copies data from the faulty used space 415 (the physical space affected by the fault condition) to the rescue space 420. Data in the normal used space 425 is handled as it would be if the storage device 110 were in normal operating mode (instead of being in the sustainable read-only mode). Because the fault condition results in a loss of physical space, there is a corresponding reduction in the size of the used LBA space 430, with some of the previously available LBA space becoming unused LBA space 435. Firmware 440, executed by the controller 120, may cause the data to be moved, as described above, and the tables to be updated.

Figure 5A:
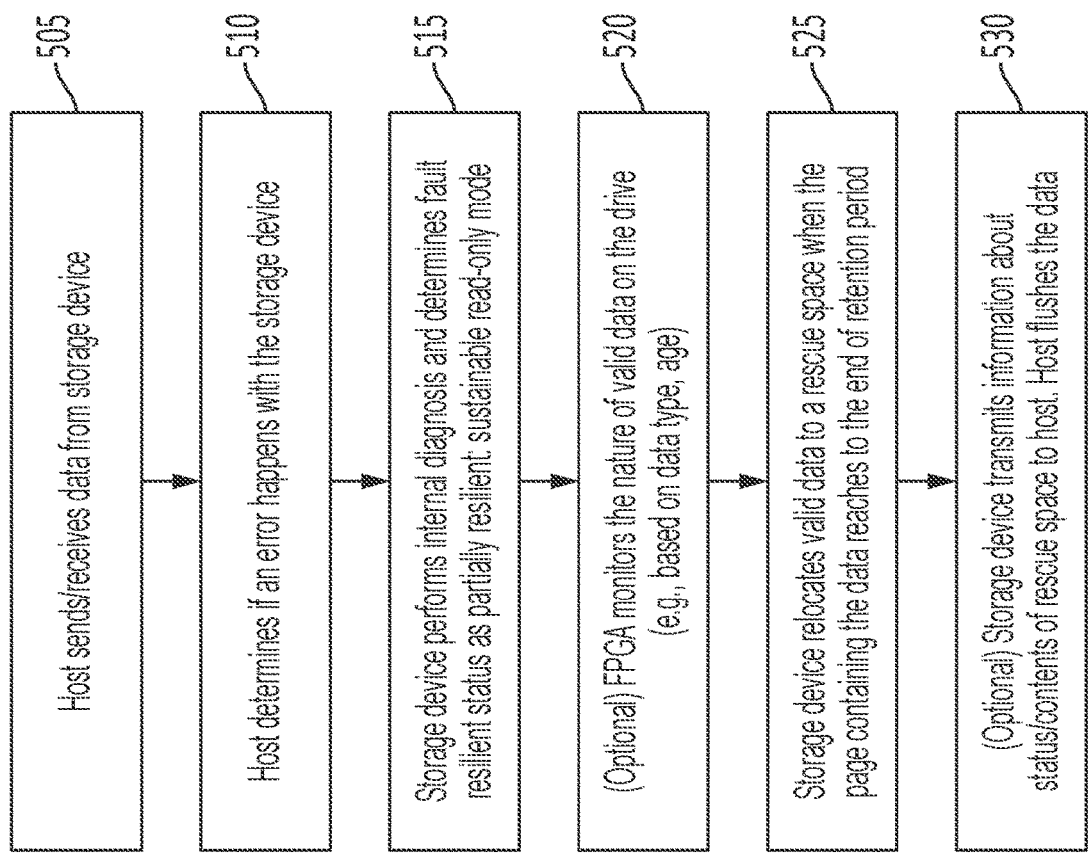
FIG. 5A is a flow chart for a first method of operation of a storage device in a fault-resilient read-only mode, according to an embodiment of the present disclosure.
Figure 5B:
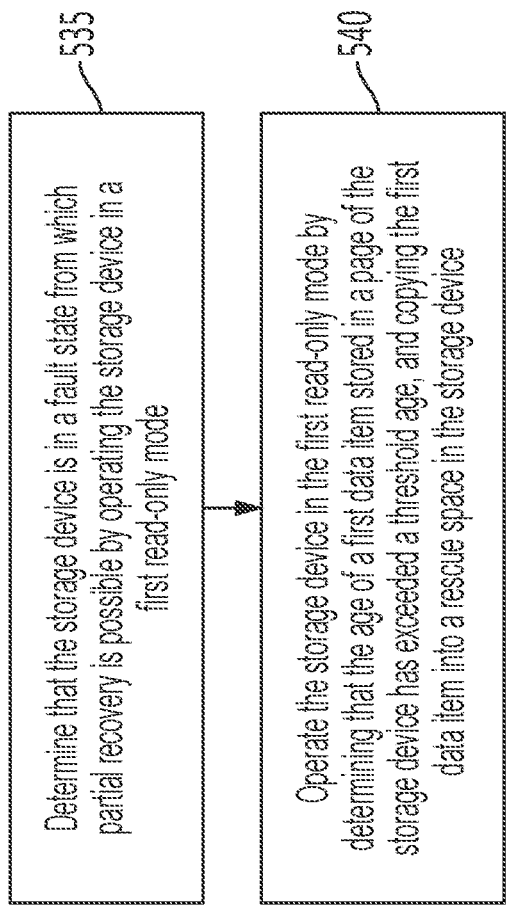
FIG. 5B is a flow chart for a second method of operation of a storage device in a fault-resilient read-only mode, according to an embodiment of the present disclosure.

FIG. 5A is a flow chart for a method of transitioning to the sustainable read-only mode, in some embodiments. At 505, the host 105 sends/receives data from storage device; at 510, the host 105 determines if an error has occurred in the storage device; at 520, the host 105 determines if an error happens with the storage device; at 525, the storage device 110 performs an internal diagnosis and transitions to the sustainable read-only mode; at 530, an FPGA may optionally monitor the nature of valid data on the storage device 110 (e.g., based on data type, or age); at 535, the storage device 110 relocates valid data to the rescue space when the age of the data approaches the retention period; and at 540, the storage device 110 may optionally transmit information about the status and contents of the rescue space to the host 105, which flushes the data. FIG. 5B is a flow chart showing details of a method for operating in a sustainable read-only mode. The method includes, at 535, determining, by the storage device, that the storage device is in a fault state from which partial recovery is possible by operating the storage device in a first read-only mode; and, at 540, operating the storage device in the first read-only mode, by determining that the age of a first data item stored in a page of the storage device has exceeded a threshold age, and copying the first data item into a rescue space in the storage device.

In some embodiments, as mentioned above, a RAID-0 system including an array of storage devices 110 and a volume manager 115 may be constructed to accommodate a transition of any of the storage devices 110 of the RAID-0 system to a read-only mode (e.g., to the sustainable read-only mode). In normal operation, the volume manager 115 may be responsible for striping the data across the array of storage devices 110, e.g., writing one strip of each stripe to a respective storage device 110 of the array of storage devices 110 (each stripe being composed of such strips). In such a system, when any of the array of storage devices 110 transitions to a read-only mode (or a "read-only state"), the RAID-0 system transitions to an operating mode (that may be referred to as "emergency mode") and the volume manager 115 for the array of storage devices 110 (i) allocates a rescue space on each of the remaining, unaffected storage devices 110 (those that remain in a read-write state) for metadata and rescued user data from faulty storage devices 110 and (ii) maintains a mapping table (which may be referred to as an "emergency mapping table"). The rescue space on each storage device 110 may be capable of storing n strips, where n=R/(strip size), R=C/M, and C is the capacity of each of the storage devices of the array of storage devices 110. The volume manager 115 may be implemented (e.g., in hardware or in software or firmware, or in a combination of hardware, software and firmware) in the host, or in a raid controller of the RAID-0 system (which may, for example, be housed in a separate enclosure from the host). In some embodiments, the volume manager 115 is implemented in an FPGA. The RAID-0 system may be self-contained and may virtualize the array of storage devices 110 so that from the perspective of the host the RAID-0 system operates like a single storage device 110. In general, the volume manager may be a processing circuit (discussed in further detail below) configured (e.g., by suitable software or firmware) to perform the operations described herein as being performed by the volume manager.

Figure 6A:
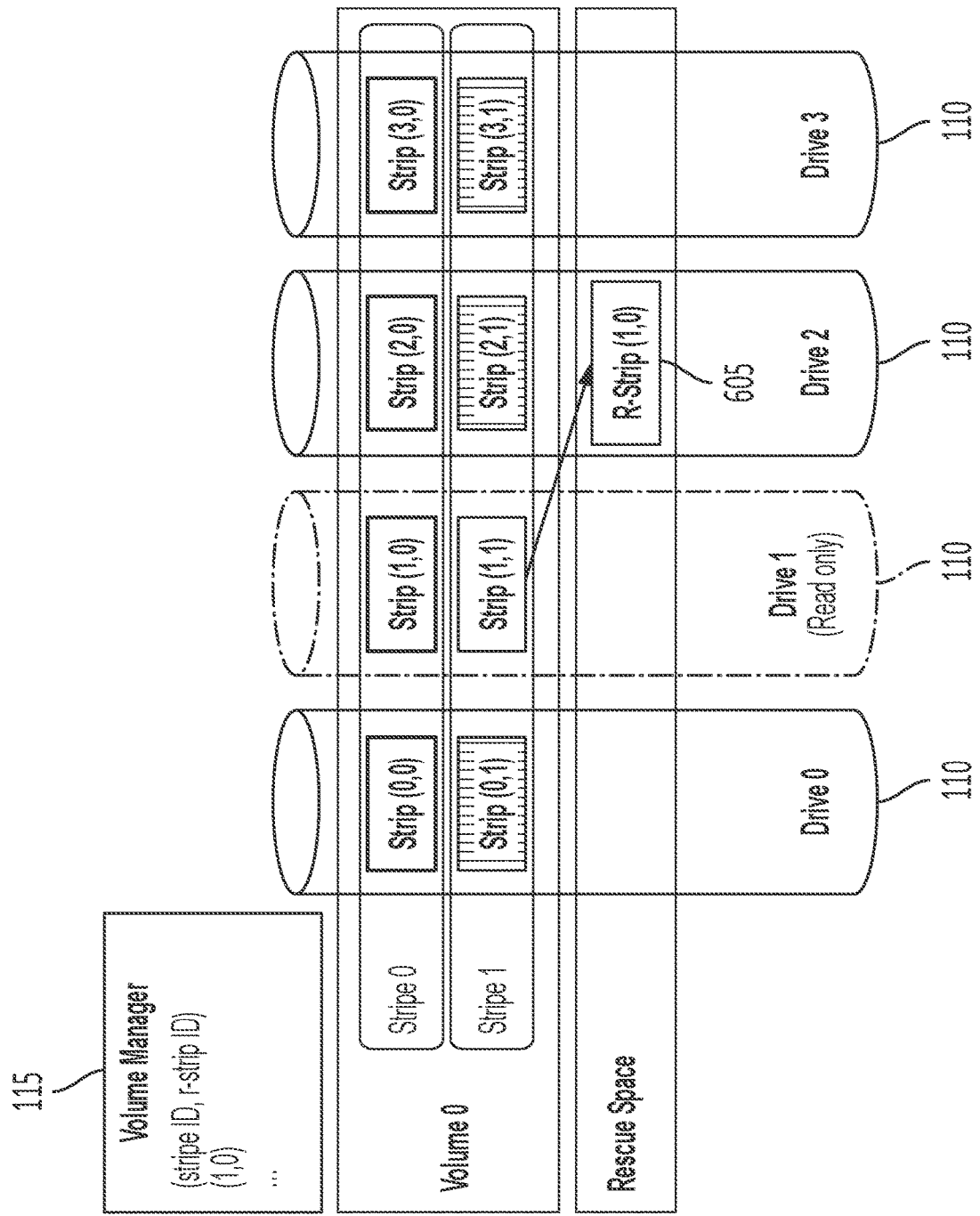
FIG. 6A is a schematic data layout diagram of a RAID-0 system performing a write operation, according to an embodiment of the present disclosure.

When the RAID-0 system is operating in emergency mode and a write command is received from the host 105, requiring that a stripe be written to the array of storage devices 110, the volume manager 115 checks the emergency mapping table to determine whether a stripe is "registered" i.e., whether an entry has already been made for the stripe. If no entry has been made yet (i.e., if the stripe is "open-mapped", i.e., not registered), the volume manager 115 makes an entry in the emergency mapping table, to indicate where the strip, that ordinarily would have been written to the faulty storage device 110 (the storage device 110 that has transitioned to read-only mode), is to be written. If the emergency mapping table already contains an entry for the stripe, then the entry is used to determine where to write the strip that ordinarily would have been written to the faulty storage device 110. In either case, the volume manager 115 then writes each strip, as illustrated in FIG. 6A, to the array of storage devices 110, writing the strip 605 that ordinarily would have been written to the faulty storage device 110 to rescue space in another storage device 110.

Figure 6B:
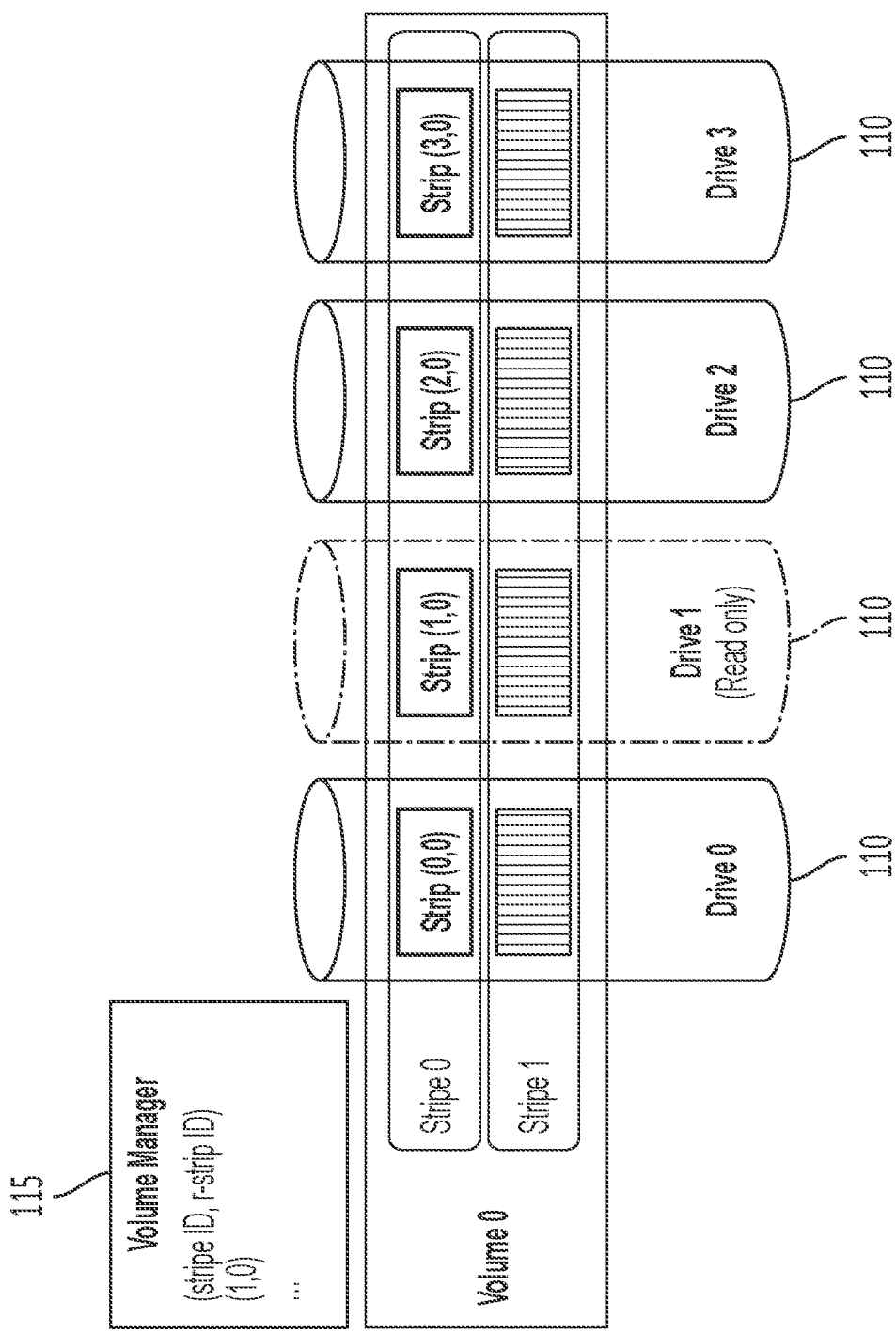
FIG. 6B is a schematic data layout diagram of a RAID-0 system performing a read operation, according to an embodiment of the present disclosure.

When a read command is received from the host 105, requiring that a stripe be read from the array of storage devices 110, the volume manager 115 checks the emergency mapping table to determine whether an entry has been made for the stripe. If no entry has been made, then, as illustrated in FIG. 6B, the volume manager 115 reads the stripe as it would have, in ordinary operation, reading a strip from each of the storage devices 110, including the faulty storage device 110. If the emergency mapping table contains an entry for the stripe, then the entry is used to determine where to read the strip that ordinarily would have been read from the faulty storage device 110.

The remapping of strips that ordinarily would have been written to the faulty storage device 110 may be accomplished, for example, as follows. Each storage device 110 of the array of storage devices 110 may have a drive identification number (or "drive ID"), which may be a number between zero and M−1, where M is the number of storage devices 110 in the array of storage devices 110. The volume manager 115 may reassign the drive identification numbers, e.g., assign to each storage device 110 of the array of storage devices 110 an alternate drive identification number to be used for performing read or write operations for registered stripes (read operations for unregistered stripes may continue to use the original drive identification numbers). The following formula may be used to generate the alternate drive identification numbers:

If drive ID<faulty drive ID, new drive ID=drive ID

Otherwise, new drive ID=((drive ID−1)+(M−1))mod(M−1)

The effect of this may be (i) to assign, to each storage device having an identification number less than the original drive identification number of the faulty storage device, the respective original drive identification number, and (ii) to assign, to each storage device having an identification number greater than the original drive identification number of the first storage device, the respective original drive identification number less one.

Using the alternate drive numbers, a target drive, to which the strip that ordinarily would have been written to the faulty storage device 110 may be written, may be identified using the formula Target Drive ID=sid % (M−1) where Target Drive ID is the alternate drive identification number of the target drive, sid is the strip identifier of the strip that ordinarily would have been written to the faulty storage device 110, and "%" is the modulo operator.

Figure 6C:
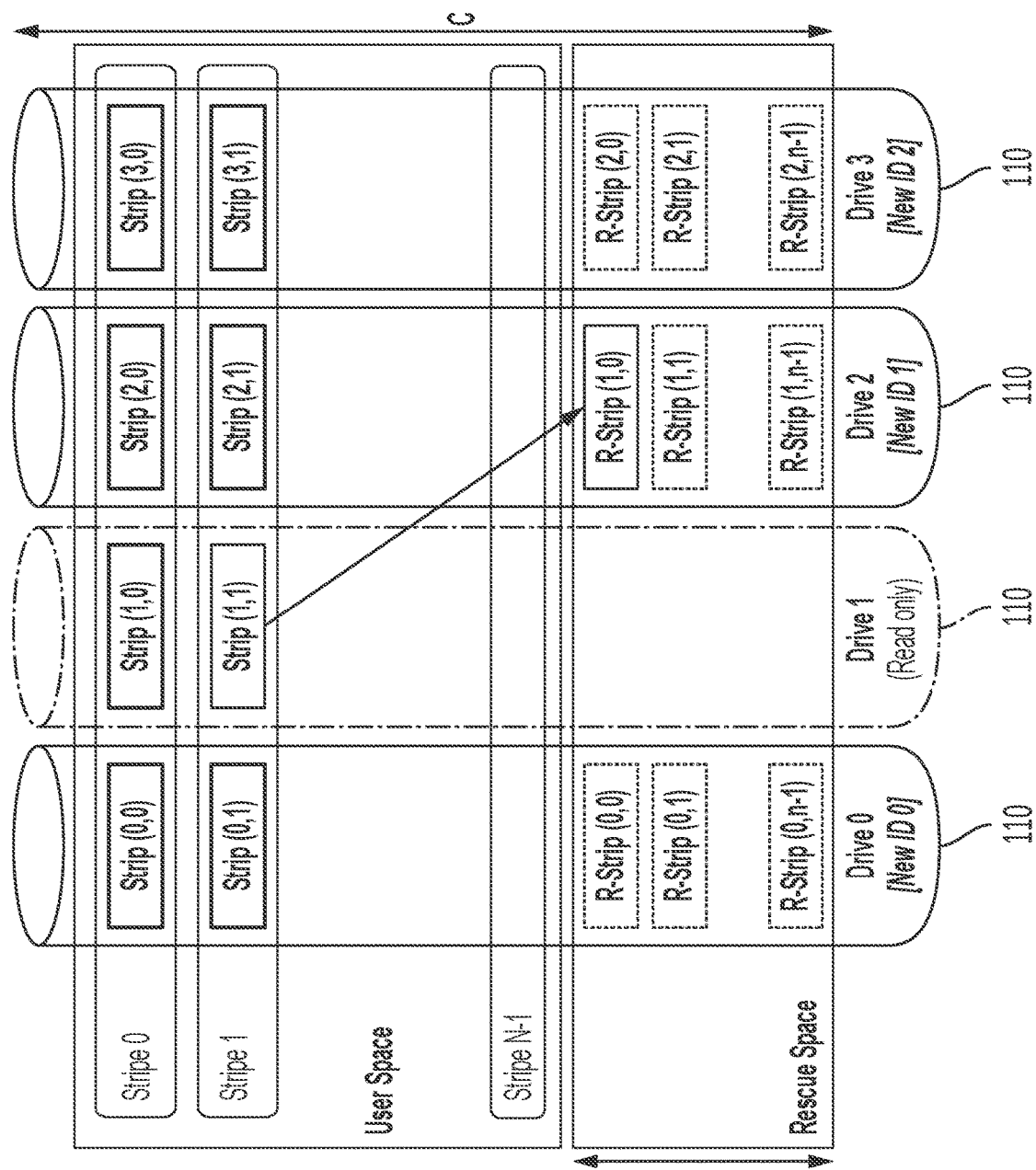
FIG. 6C is a schematic data layout diagram of a RAID-0 system performing a remapping and write operation, according to an embodiment of the present disclosure.

FIG. 6C is a schematic diagram of a RAID-0 system with four storage devices 110 (i.e., M=4) in which Drive 1 has transitioned to a read-only mode. When Stripe 1 is written, the target drive ID is implicitly determined by the equation Target Drive ID=Strip ID %(M−1)=1, i.e., the target drive is the storage device 110 with alternate drive identification number 1 (i.e., Drive 2). Within the drive, the rescue space may be split into strips (referred to as "rescue strips", or "R-Strips") the size of which is same as the strip size. The emergency mapping table may contain the entry (1,0) (the first element of which is the stripe ID (Stripe 1), and the second element of which is the R-strip ID on the target drive). As such, the entry (1,0) in the emergency mapping table means that Strip (1,1) is mapped to R-Strip (1,0).

The RAID-0 system may be constructed to accommodate a transition, by one or more of the array of storage devices 110, to either a sustainable read-only mode, or to an unsustainable read-only mode. In the case of a transition to an unsustainable read-only mode, the registered strips of the faulty storage device 110 may be written permanently to a rescue space of another device. In the case of a transition to an unsustainable read-only mode, the volume manager 115 may migrate data from the faulty storage device 110 to unaffected storage devices 110, e.g., at a rate sufficient to move all of the data from the faulty storage device 110 before it expires. The server may calculate this rate based on the amount of data and the time remaining before expiration.

Figure 7A:
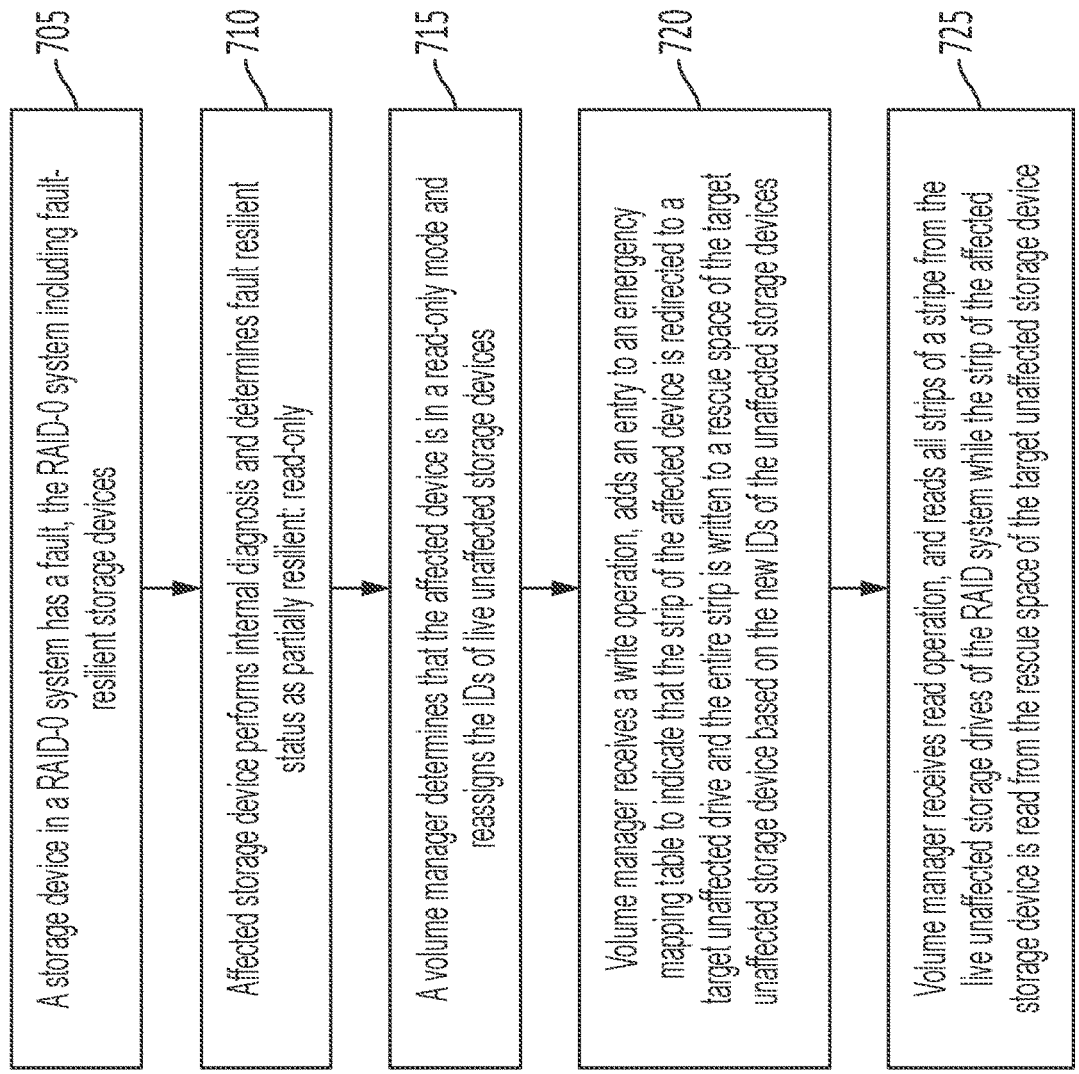
FIG. 7A is a flow chart for a first method of operation of a RAID-0 storage system, according to an embodiment of the present disclosure.

FIG. 7A is a flowchart for a method for operating a RAID-0 system. At 705, A storage device 110 in a RAID-0 system has a fault and transitions to a read-only mode; at 710, the affected storage device 110 performs an internal diagnosis and determines that its fault resilient status is partially resilient and read-only; at 715, the volume manager 115 determines that the affected storage device 110 is in a read-only mode and reassigns the IDs of ("live") unaffected storage devices; at 720, the volume manager 115 receives a write operation, adds an entry to an emergency mapping table to indicate that the strip of the affected device is redirected to a target (unaffected) storage device 110, and the entire strip is written to a rescue space of the target (unaffected) storage device based on the new drive IDs of the unaffected storage devices; and, at 725, the volume manager 115 receives a read command from the host 105, and reads all strips of a stripe from the live unaffected storage devices 110 of the RAID system while the strip of the affected storage device is read from the rescue space of the target (unaffected) storage device.

Figure 7B:
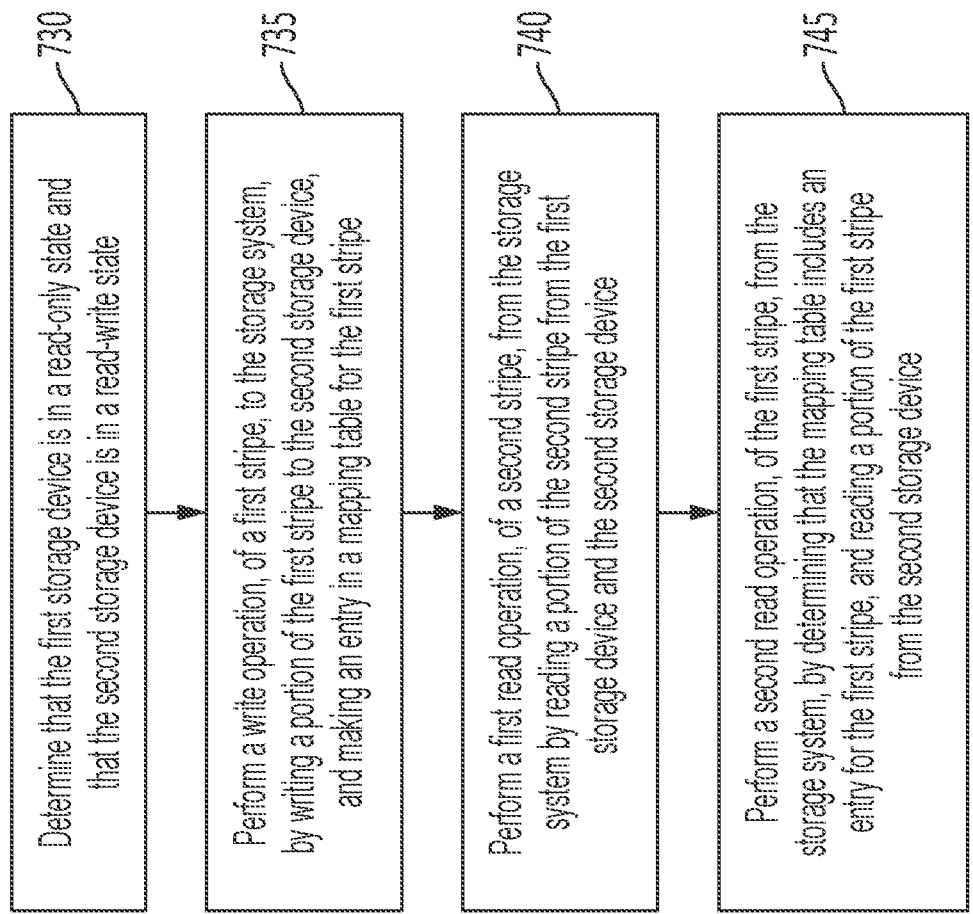
FIG. 7B is a flow chart for a second method of operation of a RAID-0 storage system, according to an embodiment of the present disclosure.

FIG. 7B is a flow chart showing details of a method for operating a RAID-0 storage system. The method includes, at 730, determining that the first storage device is in a read-only state and that the second storage device is in a read-write state; at 735, performing a write operation, of a first stripe, to the storage system, by writing a portion of the first stripe to the second storage device, and making an entry in a mapping table for the first stripe; at 740, performing a first read operation, of a second stripe, from the storage system, by reading a portion of the second stripe from the first storage device and the second storage device; and at 745, performing a second read operation, of the first stripe, from the storage system, by determining that the mapping table includes an entry for the first stripe, and reading a portion of the first stripe from the second storage device.

Various elements described herein, such as the host 105 or the controller 120, may be, or may contain, processing circuits. The term "processing circuit" or "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory) as the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for resilient operation of storage devices and systems containing storage devices have been specifically described and illustrated herein, many modifications and variations will be apparent to those skilled in the art. Accordingly, it is to be understood that a system and method for resilient operation of storage devices and systems containing storage devices constructed according to principles of this disclosure may be embodied other than as specifically described herein. The invention is also defined in the following claims, and equivalents thereof.

What is claimed is:

1. A method for operating a storage device comprising storage media, the method comprising:
   determining, by the storage device, that the storage device is in a first state associated with a first fault condition of the storage device, wherein the storage device is configured to recover from the first fault condition by taking a first action;
   determining, by the storage device, that the storage device is in a second state associated with a second fault condition of the storage device; and
   based on determining the second state, modifying operation of the storage device from a first mode to a second mode, the second mode including a read-only mode, wherein in the first mode the storage device processes a request in a first manner, and in the second mode the storage device processes the request in a second manner.

2. The method of claim 1, wherein the first action includes at least one of adjusting power of the storage device or modifying a format of the storage media.

3. The method of claim 1, wherein capacity or performance of the storage device in the second mode is lower than the capacity or the performance of the storage device in the first mode.

4. The method of claim 1, further comprising:
   determining, by the storage device, that the storage device is in a third state different from the first state and the second state, the third state being associated with a third fault condition of the storage device; and
   altering read and write operations of the storage device in response to determining that the storage device is in the third state.

5. The method of claim 4, wherein the storage device comprises a controller comprising a first core and a second core, wherein in the third state the first core determines fault associated with the second core.

6. The method of claim 1, further comprising:
   receiving a query, from a computing device, regarding a status of the storage device, and
   responding to the query with status information associated with a status level.

7. The method of claim 6, wherein the status level includes a first level, comprising:
   a first resiliency status, corresponding to the first state; and
   a second resiliency status, corresponding to the second state.

8. The method of claim 7, wherein the second resiliency status comprises a first sub-status associated with a capability of the storage device.

9. The method of claim 1, wherein the first fault condition includes an error in writing data to the storage media.

10. The method of claim 9, further comprising adjusting at least a portion of the storage media based on the error.

11. The method of claim 1, wherein the second action includes adjusting performance of the storage device related to a write operation.

12. A storage device comprising:
   a processing circuit; and
   storage media,
   the processing circuit being configured to:
      determine that the storage device is in a first state associated with a first fault condition of the storage device, wherein the storage device is configured to recover from the first fault condition by taking a first action;
      determine that the storage device is in a second state associated with a second fault condition of the storage device; and
      based on determining the second state, the processing circuit being configured to modify operation of the storage device from a first mode to a second mode, the second mode including a read-only mode, wherein in the first mode the storage device processes a request in a first manner, and in the second mode the storage device processes the request in a second manner.

13. The storage device of claim 12, wherein the first action includes at least one of adjusting power of the storage device or modifying a format of the storage media.

14. The storage device of claim 12, wherein capacity or performance of the storage device in the second mode is lower than the capacity or the performance of the storage device in the first mode.

15. The storage device of claim 12, wherein the processing circuit is further configured to:
   determine that the storage device is in a third state different from the first state and the second state, the third state being associated with a third fault condition of the storage device; and
   alter read and write operations of the storage device in response to determining that the storage device is in the third state.

16. The storage device of claim 12, wherein the processing circuit is further configured to:
   receive a query, from a computing device, regarding a status of the storage device; and
   respond to the query with a status information associated with a status level, wherein the status level includes a first resiliency status corresponding to the first state, and a second resiliency status corresponding to the second state.

17. The storage device of claim 12, wherein the first fault condition includes an error in writing data to the storage media.

18. The storage device of claim 17, wherein the processing circuit is configured to adjust at least a portion of the storage media based on the error.

19. The storage device of claim 12, wherein in taking the second action, the processing circuit is configured to adjust performance of the storage device related to a write operation.

* * * * *